(12) United States Patent
Czaplicki et al.

(10) Patent No.: US 9,394,468 B2
(45) Date of Patent: Jul. 19, 2016

(54) STRUCTURAL ADHESIVES

(75) Inventors: Michael Czaplicki, Molsheim (FR); Ira Miller, Niederhaslach (FR); Vincent Duclos, Strasbourg (FR)

(73) Assignee: ZEPHYROS, INC., Romeo, MI (US)

( * ) Notice: Subject to any disclaimer, the term of this patent is extended or adjusted under 35 U.S.C. 154(b) by 175 days.

(21) Appl. No.: 13/985,399

(22) PCT Filed: Feb. 15, 2012

(86) PCT No.: PCT/EP2012/000655
§ 371 (c)(1),
(2), (4) Date: Jan. 7, 2014

(87) PCT Pub. No.: WO2012/110230
PCT Pub. Date: Aug. 23, 2012

(65) Prior Publication Data
US 2014/0113983 A1 Apr. 24, 2014

(30) Foreign Application Priority Data
Feb. 15, 2011 (GB) .................... 1102672.1

(51) Int. Cl.
| | |
|---|---|
| *C09J 113/00* | (2006.01) |
| *C09J 151/04* | (2006.01) |
| *C09J 159/00* | (2006.01) |
| *C09J 163/00* | (2006.01) |
| *C09J 163/02* | (2006.01) |
| *C09J 175/04* | (2006.01) |
| *C09J 177/00* | (2006.01) |
| *C09J 181/04* | (2006.01) |
| *C09J 129/04* | (2006.01) |
| *C08G 59/40* | (2006.01) |
| *C08L 29/14* | (2006.01) |
| *C08L 51/04* | (2006.01) |
| *C08L 63/00* | (2006.01) |
| *C08L 75/04* | (2006.01) |
| *C08L 77/00* | (2006.01) |

(52) U.S. Cl.
CPC ........... *C09J 129/04* (2013.01); *C08G 59/4021* (2013.01); *C09J 113/00* (2013.01); *C09J 151/04* (2013.01); *C09J 159/00* (2013.01); *C09J 163/00* (2013.01); *C09J 175/04* (2013.01); *C09J 177/00* (2013.01); *C09J 181/04* (2013.01); *C08G 2650/56* (2013.01); *C08L 29/14* (2013.01); *C08L 51/04* (2013.01); *C08L 63/00* (2013.01); *C08L 75/04* (2013.01); *C08L 77/00* (2013.01)

(58) Field of Classification Search
None
See application file for complete search history.

(56) References Cited

U.S. PATENT DOCUMENTS

| | | |
|---|---|---|
| 3,640,906 A | 2/1972 | Wojcik |
| 3,872,600 A | 3/1975 | Siminsky |
| 3,944,631 A | 3/1976 | Yu et al. |
| 3,984,497 A | 10/1976 | Owens et al. |
| 3,985,703 A | 10/1976 | Ferry et al. |
| 4,034,013 A | 7/1977 | Lane |
| 4,096,202 A | 6/1978 | Farnham et al. |
| 4,304,709 A | 12/1981 | Salee |
| 4,306,040 A | 12/1981 | Baer |
| 4,464,494 A * | 8/1984 | King et al. .................... 523/400 |
| 4,495,324 A | 1/1985 | Chacko et al. |
| 4,536,436 A | 8/1985 | Maeoka et al. |
| 4,588,419 A | 5/1986 | Caul et al. |
| 4,728,544 A | 3/1988 | Asoshina et al. |
| 4,852,754 A | 8/1989 | Holdsworth et al. |
| 5,045,141 A | 9/1991 | Salensky et al. |
| 5,073,601 A | 12/1991 | Mulhaupt |
| 5,213,391 A | 5/1993 | Takagi |
| 5,218,063 A | 6/1993 | Kimball |
| 5,274,006 A | 12/1993 | Kagoshima et al. |
| 5,275,853 A | 1/1994 | Silvis et al. |
| 5,464,924 A | 11/1995 | Silvis et al. |
| 5,605,717 A | 2/1997 | Simmons et al. |
| 5,962,093 A | 10/1999 | White et al. |
| 5,985,435 A | 11/1999 | Czaplicki et al. |
| 6,015,865 A | 1/2000 | Blank et al. |
| 6,111,015 A | 8/2000 | Eldin et al. |
| 6,136,732 A | 10/2000 | Patel |
| 6,174,932 B1 | 1/2001 | Pachl et al. |
| 6,263,635 B1 | 7/2001 | Czaplicki |

(Continued)

FOREIGN PATENT DOCUMENTS

| | | |
|---|---|---|
| CA | 2524783 A1 | 11/2004 |
| CN | 101772532 A | 7/2010 |

(Continued)

OTHER PUBLICATIONS

Derwent accession No. 2011-A91344 for Chinese Patent No. 101921531 A, Chen and Yu, Dec. 22, 2010, three pages.*
Chinese Office Action dated Jul. 18, 2014; Appln. No. 201280016123.3.
International Search Report & Written Opinion dated May 21, 2012; Appln. No. PCT/EP2012/000655.
European Communication dated Jan. 10, 2013; Appln. No. 12707226.2.
International Preliminary Report on Patentability dated Aug. 29, 2013; Appln. No. PCT/EP2012/000655.
Co-Pending German Patent Application No. 07041865.7, filed Sep. 4, 2007; Published as DE 10 2007 041 865 A1 on Mar. 27, 2008.

(Continued)

*Primary Examiner* — Robert Sellers
(74) *Attorney, Agent, or Firm* — The Dobrusin Law Firm, P.C.

(57) ABSTRACT

A thermohardenable structural adhesive material that upon curing has an elongation at break of at least 10% and has a glass transition temperature (Tg) of 80° C. or higher and is useful as a structural adhesive in automobiles to reduce the deformation of bonds particularly during accidents, the adhesive is dry to the touch at ambient temperature and can be melt processed at temperature below that at which thermohardening occurs. The adhesives are useful in applications requiring a combination of high strain to failure, glass transition temperature more than 80° C., high stiffness and high strength. This combination is of particular interest in the aerospace and automotive industries.

10 Claims, No Drawings

(56) References Cited

U.S. PATENT DOCUMENTS

| | | | |
|---|---|---|---|
| 6,296,298 B1 | 10/2001 | Barz | |
| 6,311,452 B1 | 11/2001 | Barz et al. | |
| 6,358,584 B1 | 3/2002 | Czaplicki | |
| 6,359,039 B1* | 3/2002 | Chen et al. | 523/454 |
| 6,419,305 B1 | 7/2002 | Larsen | |
| 6,431,546 B1 | 8/2002 | Keller | |
| 6,431,549 B1 | 8/2002 | Hill et al. | |
| 6,455,116 B1 | 9/2002 | Xia et al. | |
| 6,467,834 B1 | 10/2002 | Barz et al. | |
| 6,474,723 B2 | 11/2002 | Czaplicki et al. | |
| 6,482,486 B1 | 11/2002 | Czaplicki et al. | |
| 6,528,546 B2 | 3/2003 | Lee et al. | |
| 6,573,309 B1 | 6/2003 | Reitenbach et al. | |
| 6,660,086 B1 | 12/2003 | Prince et al. | |
| 6,668,457 B1 | 12/2003 | Czaplicki | |
| 6,740,067 B2 | 5/2004 | Leise, Jr. et al. | |
| 6,811,864 B2 | 11/2004 | Czaplicki et al. | |
| 6,846,559 B2 | 1/2005 | Czaplicki et al. | |
| 6,884,854 B2 | 4/2005 | Schoenfeld et al. | |
| 6,887,914 B2 | 5/2005 | Czaplicki et al. | |
| 6,911,109 B2 | 6/2005 | Giroux et al. | |
| 7,125,461 B2 | 10/2006 | Czaplicki et al. | |
| 7,267,738 B2 | 9/2007 | Czaplicki et al. | |
| 7,736,743 B2* | 6/2010 | Muenz et al. | 428/413 |
| 7,892,396 B2 | 2/2011 | Sheasley | |
| 2002/0013389 A1 | 1/2002 | Taylor et al. | |
| 2002/0024233 A1 | 2/2002 | Kleino | |
| 2002/0068139 A1 | 6/2002 | Polak et al. | |
| 2002/0076566 A1 | 6/2002 | Brandys et al. | |
| 2003/0039792 A1 | 2/2003 | Hable et al. | |
| 2003/0042056 A1 | 3/2003 | Schneider et al. | |
| 2003/0057737 A1 | 3/2003 | Bock et al. | |
| 2003/0068943 A1 | 4/2003 | Fay | |
| 2003/0069335 A1 | 4/2003 | Czaplicki et al. | |
| 2003/0090129 A1 | 5/2003 | Riley et al. | |
| 2003/0176128 A1 | 9/2003 | Czaplicki et al. | |
| 2003/0183317 A1 | 10/2003 | Czaplicki et al. | |
| 2003/0186049 A1 | 10/2003 | Czaplicki et al. | |
| 2004/0033344 A1 | 2/2004 | Czaplicki et al. | |
| 2004/0076831 A1 | 4/2004 | Hable et al. | |
| 2004/0084141 A1 | 5/2004 | Czaplicki et al. | |
| 2004/0204551 A1 | 10/2004 | Czaplicki et al. | |
| 2004/0221953 A1 | 11/2004 | Czaplicki et al. | |
| 2005/0217785 A1 | 10/2005 | Hable et al. | |
| 2008/0029200 A1 | 2/2008 | Sheasley | |
| 2008/0050565 A1 | 2/2008 | Gross et al. | |
| 2008/0105992 A1 | 5/2008 | Walker et al. | |
| 2008/0254214 A1 | 10/2008 | Kassa et al. | |
| 2008/0308212 A1* | 12/2008 | Sheasley et al. | 156/78 |
| 2011/0098382 A1* | 4/2011 | Czaplicki | 523/453 |

FOREIGN PATENT DOCUMENTS

| | | |
|---|---|---|
| CN | 1 798 820 B | 9/2010 |
| DE | 6930307 | 7/1969 |
| DE | 27 19 779 A | 1/1978 |
| DE | 3 640 906 A1 | 6/1988 |
| DE | 19714348 A1 | 3/1997 |
| DE | 60 2004 007 787 T2 | 6/2008 |
| EP | 0 360 214 A2 | 3/1990 |
| EP | 0527706 A1 | 2/1993 |
| EP | 1 126 001 A2 | 8/2001 |
| EP | 1 391 250 A2 | 2/2004 |
| EP | 1 620 521 A2 | 7/2007 |
| EP | 2231348 B1 | 5/2011 |
| GB | 823203 | 11/1959 |
| JP | 56-118816 A | 9/1981 |
| JP | 57-46810 A | 3/1982 |
| JP | 3-247446 A | 11/1991 |
| JP | 4-59819 A | 2/1992 |
| JP | 9-249730 A | 9/1997 |
| JP | 10-139981 A | 5/1998 |
| JP | 2000-170736 A | 6/2000 |
| KR | 2001-0071695 | 7/2001 |
| MX | PA05011954 A | 2/2006 |
| WO | 93/05103 A1 | 3/1993 |
| WO | 98/06601 A1 | 2/1998 |
| WO | 00/10802 A1 | 3/2000 |
| WO | 01/19667 A1 | 3/2001 |
| WO | 01/46303 A2 | 6/2001 |
| WO | 02/26551 A1 | 4/2002 |
| WO | 03/022953 | 3/2003 |
| WO | 03/093387 A1 | 11/2003 |
| WO | 2004/101349 A2 | 11/2004 |
| WO | 2008/157129 | 12/2008 |
| WO | 2008/157129 A1 | 12/2008 |
| WO | 2009/124709 | 10/2009 |

OTHER PUBLICATIONS

Co-Pending PCT Patent Application No. US08/66413, filed Jun. 10, 2008; Published as WO2008/157129 A1 on Dec. 24, 2008.

Plastics Technology, "Keeping-Up with Materials. Newest Barrier Resin is Thermoplastic Epoxy", Jan. 2000.

Born et al. "Structural Bonding in Automotive Applications" Henkel Technologies Automotive, 2004.

Hopton et al. "Application of Structural Reinforcing Material to Improve Vehicle NVH Characteristics" SAE Technical Paper Series, 1999.

Lilley et al., "A Comparison of NVH Treatments for Vehicle Floorpan Applications," SAE Technical Paper Series, 2001.

Mansour et al., "Optimal Bonding Thickness for Vehicle Stiffness," SAE Technical Paper Series, 2001.

Chinese Second Office Action dated Mar. 12, 2015; Appln. No. 201280016123.3.

Chinese 3$^{rd}$ Office Action dated Sep. 17, 2015; Application No. 201280016123.3.

* cited by examiner

STRUCTURAL ADHESIVES

CLAIM OF PRIORITY

This application is a national stage of international application number PCT/EP2012/000655, filed on Feb. 15, 2012, which claims benefit of application serial number GB1102672.1, filed on Feb. 15, 2011, which are both hereby entirely incorporated by reference for all purposes.

The present invention relates to an adhesive material and in particular to a toughened material and in particular to toughened adhesive materials possessing a high strain to failure which are sometimes known as structural adhesives. In particular the invention is concerned with a thermohardenable, cross linkable adhesive materials that will produce an adhesive that has desirable mechanical properties that are maintained over a broad temperature range of interest. For example, automobiles are used in hot and cold climates and any adhesive used in the automobile should maintain its adhesive properties over the temperature range that automotive manufacturers have specified as an expected operating temperature range. It is therefore desirable that the adhesive, after curing has a high Tg since at temperatures above the Tg polymeric materials become rubbery and therefore have reduced stiffness (i.e. have a low elastic modulus). One desirable property for structural adhesives is a high elongation at break so that fracture is delayed when deformation occurs. In addition high strain to failure materials are often, but not always, more impact resistant. In a preferred embodiment prior to thermohardening the adhesive is dry to the touch at ambient temperature and can be processed at intermediate temperatures by techniques such as melt coating, extrusion or injection moulding without significant cross-linking of the polymer system occurring.

Epoxy resins are widely used in adhesives due to their ability to be cured (crosslinked), typically by heating, to produce strong, resilient bonds. Adhesives formed from Epoxy resins such as a bisphenol A or a bisphenol F based epoxy resins can have a sufficiently high Tg, however the adhesives with high Tg in general do not have a high elongation at break. The formulator of adhesives selects the ingredients in order to obtain the desired combination of properties. Attempts have been made to increase the elongation at break by the inclusion of rubbery materials or other polymers in the adhesive formulation. However, the addition of such ingredients reduces the Tg of the cured adhesive and often weakens the adhesive and often reduces the adhesion durability or hydrolysis resistance of adhesive, with polyamide-epoxy hybrids being an example. Previously increasing the elongation has therefore resulted in an undesirable reduction in Tg elastic modulus and often strength. The present invention overcomes this problem.

The present invention provides a thermohardenable structural adhesive with the desirable combination of Tg and high elongation to break.

In a preferred embodiment the adhesive is solid and dry to the touch at room temperature and can be processed by heating at a temperature below that at which it will cure, particularly so that the adhesives can be processed by melt coating, extrusion or injection moulding and can resolidify on cooling without curing during the forming process.

The invention is particularly aimed at adhesives that can be used in the automotive and aerospace industries which can add strength to the area where the adhesive is used by rigidifying the bond between substrates (components) and adding stiffness to the bond without imparting undesirable brittleness. The adhesives may be used to provide structural adhesive properties, in particular they may be used as hem flange adhesives in automobiles and can also provide crash resistance where a greater elongation to resist breakage on deformation is desirable. In order to be useful in the automobile industry the adhesive once cured needs to retain its mechanical properties over a suitable temperature range, such as −40° C. to 80° C. to which vehicles can be expected to be subjected to resulting from environmental exposure, although in some instances higher temperatures can be experienced due to heat generated by the vehicle.

Structural adhesives are known such as, for example, those described in PCT Publication WO 2008/157129. However, it has not been possible to obtain materials which have the optimum combination of properties for certain applications. Properties of epoxy based structural adhesives with which the formulators and users of adhesives often are concerned with are elongation at break, glass transition temperature, stiffness and strength. However, depending on the application, there can be other important properties as well such as fracture toughness, peel resistance, wedge impact resistance, and environmental exposure resistance. Generally the desire is for each property to be as high as possible. However, hitherto it has not been possible to obtain the optimum combination of properties. The combination of high glass transition temperature, high stiffness and high strength can be achieved, furthermore the combination of high elongation and high strength can be achieved but at the expense of a high glass transition temperature and typically high stiffness as well.

WO 2008/157129 is concerned with an adhesive formulation that includes an epoxy resin, an impact modifier and/or a flexibilizer and a curing agent. The adhesives are tacky at ambient temperature. In a preferred embodiment the adhesive contains a thermoplastic polyether such as a phenoxy resin. The formulations are designed to produce adhesives having high wedge impact strength and are characterized by one or any combination of the following features: the adhesive material has an impact strength of greater than 15 N/mm preferably greater than 20 N/mm at temperatures less than −30° C. using an ISO-11343 Impact Wedge Peel with 0.8 mm thick EG-60 Adherends. WO 2008/157129 is not therefore concerned with providing adhesives with a combination of a high Tg, above 80° C., and a high elongation at break (above 10%).

Similarly, WO 2009/124709 is concerned with increasing wedge impact strength and the resilience of the adhesive to environmental exposure. Additionally WO 2009/124709 is not concerned with increasing the elongation at break of epoxy based adhesive systems. Furthermore, it is not concerned with heat activatable adhesives that are dry to the touch at ambient temperature and which can be processed at temperatures below their activation temperature. The cured adhesives produced from these combinations are undesirably brittle, for certain applications, particularly those applications where the substrate material is in a location that might experience high levels of plastic deformation.

Structural adhesives are typically applied to the areas to be bonded as liquids or pastes which leads to storage problems and concerns that during storage and transportation the pastes or liquids can pick up dirt and contamination. Furthermore, pumps and liquid containers are required for application. It would therefore be desirable to provide an adhesive composition that is a solid and dry to the touch at ambient temperature and can be pelletized and processed and delivered to the areas to be bonded by heating to provide a material that can wet the surface to which it is applied at a temperature below that at which it will thermoharden (cure). Accordingly, although the adhesives of the present invention may be liquids or paste in the preferred embodiment material they are solid and dry to the touch at ambient temperature and can be applied by melt coating, extrusion or injection moulding and which can resolidify on cooling and can subsequently be activated to develop the structural adhesive properties.

The elongation of the adhesive indicates its ability to deform under stress, the greater the elongation the greater the ability to deform without fracturing. An example of the benefit of high elongation is when the substrate or substrates upon which the adhesive is employed undergoes plastic deformation such as can happen to metal components in an automobile crash where the use of an adhesive with high elongation (coupled with the desired bond strength) can result in areas remaining stabilized. A high level of elongation becomes particularly important as the thickness of the material utilized increases. Other benefits of high elongation can be realised when the adhesive is used in a hem flange in that damaged components (such as doors) can be bent during repair back to its original shape without fracturing the adhesive thus retaining corrosion protection.

The present invention therefore provides a thermohardenable structural adhesive material that upon curing has a high elongation at break in addition to a high elastic modulus and has a glass transition temperature (Tg) of 80° C., or higher.

In this application the tan delta peak is considered to be (Tg) and is obtained from a dynamic mechanical analysis test (DMA). The tensile properties of the adhesive including the elongation are measured by the test ASTM D 638 Type 1. Viscosity is measured using a parallel plate rheometer.

The elongation at break of the cured adhesive is at least 10%, preferably at least 15% and more preferably at least 20% and can be up to 50%. The glass transition temperature of the cured adhesive is above 80° C. and is preferably above 90° C. The adhesive can also have a high elastic modulus as shown by a stiffness that is preferably at least 100 MPa and the strength as demonstrated by the lap shear is preferably at least 7 MPa more preferably at least 10 MPa, however the lap shear value achievable will depend in part on whether the material expands, or foams, during the curing process. If the material foams, a lower level of lap shear strength can be expected as compared to if the material does not foam.

The adhesive composition may be a liquid or a paste although it is preferably solid and non tacky to the touch at ambient temperatures (such as 20° C.). The uncured adhesive is processable at temperatures below its activation temperature so that it may be provided as a melt, such as by extrusion onto the location where it is to be employed or it may be injection moulded to form components of the adhesive. The components may be totally of the adhesive or may comprise carriers that are overmolded with the adhesive. Alternatively the adhesive may be melt coated at the desired location. The viscosity required of processability are those known in the art and depend upon the processing technique and the processing temperatures to be employed. Slip agents may be included in the adhesive formulation in order to aid processing. Examples of slip agents include oleamide and behenamide. However the use of slip agents can reduce the Tg of the cured adhesive so the amounts used should be minimised and it is preferred to use less than 1 wt % of slip agent.

In a further embodiment the present invention provides a thermohardenable epoxy based structural adhesive composition capable of producing a cured adhesive having a Tg of 80° C. or higher, and an elongation at break of at least 10%.

We have found that such a desirable combination of properties may be achieved with an epoxy-based adhesive if a suitable thermoplastic modifier such as a thermoplastic epoxy resin together with a flexibiliser is included in the adhesive formulation. The thermoplastic modifier is preferably a product that is compatible with an epoxy resin as the epoxy resin cures to provide the required strength and Tg and the thermoplastic component contributes to providing the required elongation. Examples of suitable thermoplastic modifiers include phenoxy resins and polyether amines.

Although the presence of a thermoplastic epoxy resin can increase the elongation the increase may not be sufficient to enable the formulated material to function in all applications that can be addressed by the invention. Other additives may therefore be included in the formulation according to the specific balance of properties that is required. The elongation may be further increased by the incorporation of other additives in the formulation, such as a core/shell material which is particularly useful. Other preferred additives include hydroxy terminated polyurethane polymer, polyvinyl polymers particularly polyvinyl butyral or polyamides particularly low melting polyamides. The choice of additives and the preferred combination of additives depends upon the properties of the adhesives required, however, we have found that a combination of additives containing a hydroxy terminated polyurethane prepolymer can give an elongation of around 20% particularly when used together with a core/shell material and a CTBN modified epoxy material. Similarly a combination of additives containing a polyvinyl polymer, particularly polyvinyl butyral can give an elongation of 15% to 25% and when used together with the hydroxy terminated polyurethane prepolymer can give an elongation as high as 50% and sometimes higher.

The composition is preferably dry to the touch at ambient temperature (20° C.) and preferably can be pelletized and moulded at temperatures below the activation temperature of the curing agent and any blowing agent that may be present. The composition therefore preferably has a melting point between 80° C. and 120° C., more preferably between 80° C. and 110° C. with a thermohardening or cure temperature of from 130° C. to 210° C., preferably between 130° C. to 150° C.

The preferred concentrations of the components in the adhesive formulation depend upon the intended application of the adhesive material. The adhesive material of the present invention may be applied to various articles of manufacture for adhering (e.g., structurally adhering) a first surface of one, two or more components (e.g., members) to a second surface of one, two or more components. Such adhesion can provide structural integrity and/or adhesion to components of articles and may also provide sealing, damping, reinforcement or the like to the component of the articles. Examples of such articles of manufacture include, without limitation, household, or industrial appliances, furniture, storage containers, buildings, structures, or the like. In preferred embodiments, the adhesive material is applied to components of an automotive vehicle such as body or frame members (e.g., a vehicle frame rail). In the invention the adhesive material can be applied to one or more surfaces of one of the components or articles in a pre-activated state in which it adheres to the surface whilst remaining thermohardenable thus it will adhere to the surface on application as a melt without curing. The material may subsequently be activated to cure or harden, and optionally expand and/or foam. Upon application, the adhesive material typically wets the surfaces that the material contacts to adhere to those surfaces.

In one embodiment the adhesive can be foamable in which case it will contain a physical and/or chemical blowing agent. In this embodiment the material will expand to a volume greater than its volume in the unexpanded state (e.g., at least 5% greater, at least 20% greater or even possibly at least 50% greater). Where the adhesive is to be employed in areas where it is desired to reduce deformation on input it is preferred, at least for structural adhesives, that the volumetric expansion be relatively low such that the expanded volume is less than 400%, more typically less than 300%, even more typically less than 200% relative to the original unexpanded volume.

Percentages herein refer to weight percent, unless otherwise indicated.

The materials used in the present invention will now be described in more detail.

Epoxy Resin

Epoxy resin is used herein to mean any of the conventional epoxy materials containing at least one epoxy functional group. The epoxy resins can be difunctional, trifunctional, multifunctional, combinations thereof or otherwise. Moreover, the term epoxy resin can be used to denote one epoxy resin or a combination of epoxy resins. The polymer-based materials may be epoxy-containing materials having one or more oxirane rings polymerizable by a ring opening reaction. In preferred embodiments, the adhesive material of this invention includes between about 2% and 70% by weight epoxy resin, more preferably between about 7% and 50% by weight epoxy resin and even more preferably between about 15% and 40% by weight epoxy resin and even possibly between about 15% and about 25% by weight epoxy resin.

The epoxy may be aliphatic, cycloaliphatic, or aromatic. The epoxy may be supplied as a solid (e.g., as pellets, chunks, pieces or the like) or a liquid (e.g., an epoxy resin) or both. As used herein, a resin is considered to be a solid resin if it is solid at a temperature of 23° C. and is considered to be a liquid resin if it a liquid at 23° C. The presence of the epoxy resin increases the adhesion, flow properties, or both of the adhesive. One exemplary epoxy resin may be a phenolic resin, which may be a novalac type or other type resin. For example, bisphenol A resin, bisphenol F resin, a combination thereof or the like may be employed. Moreover, various mixtures of several different epoxy resins may be employed. Examples of suitable epoxy resins are sold under the tradename DER< (R)> (e.g., DER 331, DER 661, DER 662), commercially available from the Dow Chemical Company, Midland, Mich.

Liquid epoxy resins that may be used typically has a viscosity at a temperature of 23° C. of at least 5000, more typically at least 8000 and even possibly at least 11,000 cps, but typically less than 30,000, more typically less than 22,000 and even possibly less than 15,000 cps, although higher and lower values may also be possible unless otherwise stated. The liquid epoxy resin typically has an epoxy equivalent weight of at least 80, more typically at least 150 and even possibly at least 185 g/eq, but typically less than 300, more typically less than 220 and even possibly less than 195 g/eq, although higher and lower values may also be possible unless otherwise stated. Preferred liquid resins include diglycidyl ethers that may be aromatic phenol based (bisphenol A or F) and are sold under the tradename DER 331, commercially available from the Dow Chemical Company and EPON 828 and EPON 863, commercially available from Hexion Specialty Chemicals.

In the preferred embodiment the epoxy resins used are such that the formulated adhesive is dry to the touch at ambient temperature.

Thermoplastic Modifiers

The thermoplastic modifiers are typically polyethers which include pendant hydroxyl moieties. Particularly desirable thermoplastic polyethers are phenoxy resins. As used herein, phenoxy resin is a polyhydroxyether, with ether linkages along the polymer backbone and pendant hydroxyl groups. Useful phenoxy resin is the reaction product of a phenol based difunctional epoxy resin and a difunctional phenol (for example the reaction product of bisphenol A epoxy with bisphenol A). A similar material may also be synthesized directly from a bisphenol (for example bisphenol A) and epichlorohydrin. The terminal epoxy group may be ring opened to generate a terminal alpha glycol group. The phenoxy resins have weight-average molecular weights of at least about 5,000, more typically at least about 25,000 and still more typically at least about 50,000 but less than about 100,000, more typically less than about 75,000 and still more typically less than about 60,000. Examples of useful phenoxy resins include PAPHEN Phenoxy Resin PKHH and PKHJ from Inchem Corp. It is preferred that the phenoxy resins have a broad molecular weight distribution.

Other thermoplastic polyethers include aromatic ether/amine repeating units in their backbones such as polyetheramines, poly(amino ethers), copolymers of monoethanolamine and diglycidyl ether, combinations thereof or the like. Examples of thermoplastic polyethers are disclosed in U.S. Pat. Nos. 5,275,853; 5,464,924 and 5,962,093.

The thermoplastic modifiers such as the polyethers preferably comprise between 3% and about 40% by weight of the adhesive material and even more preferably between about 10% and 30% more preferably between 10% and about 15%.

Curing Agent

The curing agents assist the adhesive material in curing by crosslinking of the polymers, epoxy resins and other ingredients in the material. The amount of curing agents or curing agent accelerators present in the adhesive material range from about 0.001% by weight to about 9% by weight and more typically from about 0.2 to about 6 wt %, and even more typically from about 2 wt % to about 6% by weight. The curing agent materials can be selected from aliphatic or aromatic amines or their respective adducts, amidoamines, polyamides, cycloaliphatic amines, anhydrides, polycarboxylic polyesters, isocyanates, phenol-based resins (e.g., phenol or cresol novolak resins, copolymers such as those of phenol terpene, polyvinyl phenol, or bisphenol-A formaldehyde copolymers, bishydroxyphenyl alkanes or the like), dihydrazides, sulfonamides, diamino diphenyl solfone, anhydrides, mercaptans, imidazoles, ureas, tertiary amines, BF3 complexes or mixtures thereof. Particular preferred curing agents include modified and unmodified polyamines or polyamides such as triethylenetetramine, diethylenetriamine tetraethylenepentamine, cyanoguanidine, dicyandiamides and the like.

An accelerator for the curing agents (e.g., a modified or unmodified urea such as methylene diphenyl bis urea, an imidazole, blocked amine or a combination thereof) may also be provided for preparing the adhesive material.

The adhesive formulation may contain other additives such as flexibilizers, impact modifiers, polymers or copolymers fillers and other elongation promoting additives.

Elongation Promoting Additives and Flexibilizers

The presence in the adhesive of this invention of certain polymers without epoxy reactivity can lead to the increased elongation at break of the cured adhesive and/or increase the flexibility of the cured adhesive. Whilst the associated mechanism is not fully understood at the moment it is believed that the polymer undergoes phase separation during the curing of the epoxy reactive components providing more flexible zones within the cured adhesive. Alternatively, the additive may act as a plasticizing agent that is compatible with epoxy resin but forms domains between cross-linked epoxy molecules that promote the ability of the material to deform without breaking. They are useful in increasing overall polymer matrix plasticity which in turn makes the addition of other types of toughening agent more effective by, for example, phase separation of rubber modified epoxies and the use of core/shell polymers. We have found that hydroxy terminated urethane polymers are particularly useful, isocyanate termination should be avoided as this can produce simple component materials that have limited shelf stability due to the reaction of the isocyanate functionality with moisture, either atmospheric, or within the material.

Alternatively, it has been found that polyvinyl esters in particular polyvinyl butyral resins such as the Butvar resins available from Solutia, particularly Butvar 90 and the Mowital resins available from Kuraray are useful.

The use of the term flexibilizer can relate to a single flexibilizer or a combination of multiple different flexibilizers. Although other flexibilizers may be employed, preferred flexibilizers include polymers that are amine modified, epoxy modified, or both. These polymers can include thermoplastics, thermosets or thermosettables, elastomers, combinations thereof or the like. These polymers may be modified with aromatic or non-aromatic epoxy and/or may be modified with bisphenol-F type, bisphenol-A type, combinations thereof or other type epoxy. Examples of preferred flexibilizer are epoxidized polysulfides sold under the tradenames EPS-350 and EPS-80, commercially available from Akzo Nobel.

The flexibilizer DY 965 CH available from Huntsman is particularly useful. An example of another preferred flexibilizer is an epoxy-dimer acid elastomer sold under the tradenames HYPDX DA 323, commercially available from CVC Specialty Chemicals. An example of other preferred flexibilizers are polyurethane modified epoxies sold under the tradenames GME-3210 and GME-3220, commercially available from GNS Technologies. Without being bound by theory, it is believed that when a polyurethane modified epoxy flexibilizer is included; the adhesive material may substantially maintain impact strength (e.g., impact resistance) at low temperatures, while minimizing the reduction of Tg (e.g., as compared to other flexibilizers). Yet further examples of preferred flexibilizer are amine or epoxy terminated polyethers such as JEFFAMINE D-2000, commercially available from Huntsman and DER<(R)>732, commercially available from the Dow Chemical Company. Flexibilizers based on cashew nutshell liquid such as the epoxidized liquids Cardolite NC-514 and Cardolite Lite 2513 HP are also useful flexibilizers. All of the individual flexibilizers discussed herein may be used separately or in combination with each other in the adhesive material of the present invention, unless otherwise stated.

Low melting thermoplastic polyamides such as the Elvamide resins available from Du Pont are particularly useful. Preferred are the polyamide resins melting at a temperature in the range 110° C. to 175° C. particularly 115° C. to 160° C. Hydroxy terminated urethane prepolymers such as the Estane products available from Lubrizol and the Pearlbond products available from Merquinson are also useful.

Typically, the flexibilizer is at least 2%, more typically at least 3% and even possibly at least 5% by weight of the adhesive material but is typically less than 50%, more typically less than 35% and even possibly less than 20% by weight of the adhesive material, although higher and lower values may also be possible unless otherwise stated. It is also contemplated in particular that the amount of flexibilizing agent may be higher in embodiments where the agent is modified with an epoxy component.

Impact Modifier

The adhesive material of the present invention includes at least one impact modifier, sometimes known as a toughening agent which contributes to the desired mechanical properties of the adhesive such as Lap Shear and T Peel strength by the distribution of energy within the adhesive system. It is generally preferable for the impact modifier to be at least 4%, more typically at 10%, and even more typically at least 20% by weight of the adhesive material and also preferable for the impact modifier to be less than 70%, more typically less than 40% an even more typically less than 30% by weight of the adhesive material.

The term "impact modifier" can include one impact modifier or several impact modifiers. The impact modifier can include thermoplastics, thermosets or thermosettables, elastomers, combinations thereof or the like. In a preferred embodiment the impact modifier includes elastomer (including elastomer containing materials), a core/shell polymer (which may include elastomer), or a combination thereof.

In a preferred embodiment at least two impact modifiers are used and the impact modifier includes a substantial portion of core/shell impact modifier. When it includes a core/shell polymer it is preferred that the impact modifier is compromised of at least 60%, more typically at least 80% and even possibly at least 97% core/shell polymer. As used herein, the term core/shell impact modifier denotes an impact modifier wherein a substantial portion (e.g., greater than 30%, 50%, 70% or more by weight) thereof is comprised of a first polymeric material (i.e., the first or core material) that is substantially entirely encapsulated by a second polymeric material (i.e., the second or shell material). The first and second polymeric materials, as used herein, can be comprised of one, two, three or more polymers that are combined and/or reacted together (e.g., sequentially polymerized) or may be part of separate or the same core/shell systems.

The first and second polymeric materials of the core/shell impact modifier can include elastomers, polymers, thermoplastics, copolymers, other components, combinations thereof or the like. In preferred embodiments, the first polymeric material, the second polymeric material or both of the core/shell impact modifier include or are substantially entirely composed of (e.g., at least 70%, 80%, 90% or more by weight) one or more thermoplastics. Exemplary thermoplastics include, without limitation, poly-styrenics, poly-acrylonitriles, poly-acrylates, poly-acetates, polyamides, and poly-olefins.

Preferred core/shell impact modifiers are formed by emulsion polymerization followed by coagulation or spray drying. In certain applications, coagulated grades of core/shell impact modifiers have been found particularly desirable for promoting adhesion to surfaces having impurities thereon such as dirt, oil (e.g., metal stamping oil) or the like. Such impact modifiers can reduce the likelihood of adhesive failure (as opposed to cohesive failure).

Examples of useful core-shell graft copolymers that may be used as impact-modifiers are those where hard containing compounds, such as styrene, acrylonitrile or methyl methacrylate, are grafted onto a core made from polymers of soft or elastomeric containing compounds such as butadiene or butyl acrylate. U.S. Pat. No. 3,985,703, describes useful core-shell polymers, the core polymers of which are made from butyl acrylate but can be based on ethyl isobutyl, 2-ethylhexyl or other alkyl acrylates or mixtures thereof. The core polymer may also include other copolymerizable containing compounds, such as styrene, vinyl acetate, methyl methacrylate, butadiene, isoprene, or the like. The core polymer material may also include a cross linking monomer having two or more nonconjugated double bonds of approximately equal reactivity such as ethylene glycol diacrylate, butylene glycol dimethacrylate, and the like. The core polymer material may also include a graft linking monomer having two or more nonconjugated double bonds of unequal reactivity such as, for example, diallyl maleate and allyl methacrylate.

The shell portion may be polymerized from methyl methacrylate and optionally other alkyl methacrylates, such as ethyl and butyl methacrylates or mixtures thereof. Up to 40 percent by weight or more of the shell monomers may be styrene, vinyl acetate, vinyl chloride, and the like. Additional core-shell graft copolymers useful in embodiments of the present invention are described in U.S. Pat. Nos. 3,984,497; 4,096,202; 4,034,013; 3,944,631; 4,306,040; 4,495,324; 4,304,709; and 4,536,436. Examples of core-shell graft copolymers include, but are not limited to, "MBS" (methacrylate-butadiene-styrene) polymers, which are made by polymerizing methyl methacrylate in the presence of polybutadiene or a polybutadiene copolymer rubber. The MBS graft copolymer resin generally has a styrene butadiene rubber core and a shell of acrylic polymer or copolymer. Examples of other useful core-shell graft copolymer resins include, ABS (acrylonitrile-butadiene-styrene), MABS (methacrylate-acrylonitrile-butadiene-styrene), ASA (acrylate-styrene-acrylonitrile), all acrylics, SA EPDM (styrene-acrylonitrile grafted onto elastomeric backbones of ethylene-propylene diene monomer), MAS (methacrylic-acrylic rubber styrene), and the like and mixtures thereof.

One preferred impact modifier is a core/shell polymer including a shell of polymethyl methacrylate (PMMA) or acrylonitrile polymer or copolymer and a core of butadiene or styrene butadiene polymeric material. Examples of useful impact modifiers include, but are not limited to those sold under the tradename, PARALOID, from Rohm & Haas Co. Preferred grades of PARALOID are EXL-2691A or EXL-2650A. Other preferred materials are CLEARSTRENGTH E-950 and Biostrength 150, available from Arkema.

Other preferred core/shell impact modifiers include those with a relatively soft acrylate core (e.g., polybutyl acrylate or other low Tg acrylate) and a hard acrylate shell (e.g., PMMA). Preferred materials are sold under the tradename DURASTRENGTH D-440 from Arkema and Paraloid EXL-2300 and 2314 from Rohm and Haas.

In one aspect of the present invention, it can be desirable for a portion or the entirety of the impact modifier to form a discrete secondary phase in the adhesive material. In this embodiment, at least 30%, more typically at least 60% and even possibly at least 90% or the entirely of the impact modifier, by weight, has a relatively low Tg and preferably forms a discrete secondary phase in the adhesive material prior to, during or after cure. Preferably, the relatively low Tg is below 20° C., more typically below 50° C. and below 70° C. For any core/shell polymer, the core, the shell, or both can have the relatively low Tg. In a preferred embodiment, however, the core can have a relatively low Tg while the shell may have a higher Tg and potentially be compatible with the rest of the adhesive material (i.e., the portion of the adhesive material that is not part of the secondary phase).

Further useful polymeric additives include particulate (e.g., ground or pulverized) elastomer or rubber or adduct thereof (e.g., carboxyl terminated butadiene acrylonitrile rubber/epoxy adduct). Such modifiers are useful to increase elongation however they tend to reduce Tg to some extent depending on the percentage and type of elastomer used in the material. Examples of desirable impact modifiers of this type include HYPDX RK 8-4, from CVC specialty chemicals or Araldite LT 1522 ES, from Huntsman Chemical. Liquid rubber modified epoxy resins may also be used. Particularly preferred are solid epoxy adducts of a carboxylated, solid, high molecular weight nitrile rubber. It may also be desirable to include another nitrile rubber such as a hydrogenated butadiene nitrile rubber as part of the whole of the impact modifier. These can interact synergistically with the core/shell polymer to increase elongation but should be used in low amounts to retain the desired Tg of 80° C. or higher.

In a preferred embodiment the adhesive material of this invention includes between about 5% and 70 wt % adduct, preferably between 10 and 50 wt %, more preferably between 15 and 30 wt %.

Blowing Agent

If the adhesive composition is foamable it will contain one or more foaming agents that typically produce inert gasses that transform the adhesive into an open and/or closed cellular structure. The expansion can help to improve adhesion, sealing capability, acoustic damping, reduce density, or a combination of factors. Amounts of blowing agents and blowing agent accelerators that can be used can vary widely depending upon the type of cellular structure desired, the desired amount of expansion of the adhesive material, the melt viscosity of the materials, and the desired rate of expansion. Exemplary ranges for the amounts of blowing agents and blowing agent accelerators in the activatable material range from about 0.001% by weight to 2%.

Chemical blowing agents that may be used include one or more nitrogen containing groups such as amides, amines, and the like. Examples of suitable blowing agents include dinitrosopentamethylenetetramine, azodicarbonamide, dinitroso-pentamethylenetetramine, 4,4'oxy-bis-(benzene-sulphonylhydrazide), trihydra-zinotriazine and N,N'-dimethyl-N,N'-dinitroso-terephthalamide.

Physical blowing agents may additionally or alternatively be employed. As one example, solvent filled polymeric shells that soften and expand upon exposure to heat may be used. A typical example is sold under the trade name Expancel by Akzo Nobel.

An accelerator for the chemical blowing agents may also be provided in the adhesive to increase the rate at which the blowing agents form inert gasses. One preferred blowing agent accelerator is a metal salt, such as an oxide, for example zinc oxide. Other preferred accelerators include organic bases such as urea and organic acids such as adipic or benzoic acid. Zinc benzene sulfonate may also be a desirable accelerator.

Polymer or Copolymer

The adhesive material may include one or more additional polymers (e.g., copolymers), which are typically, but not necessarily copolymers or terpolymers, which can include a variety of different polymers, such as thermoplastics, elastomers, thermosets, thermosettables combinations thereof or the like. For example, and without limitation, polymers that might be appropriately incorporated into the adhesive material include halogenated polymers, polycarbonates, polyketones, and polymers of urethanes, polyesters, silanes, sulfones, allyls, olefins, styrenes, acrylates, methacrylates, epoxies, silicones, phenolics, rubbers, polyphenylene oxides, terphthalates, acetates (e.g., EVA), acrylates, methacrylates (e.g., ethylene methyl acrylate polymer) or mixtures thereof. Other potential polymeric materials may be or may include, without limitation, polyolefin (e.g., polyethylene, polypropylene) polystyrene, polyacrylate, polyethylene oxide), poly (ethyleneimine), polyester, polyurethane, polysiloxane, polyether, polyphosphazine, polyamide, polyimide, polyisobutylene, polyacrylonitrile, polyvinyl chloride), poly (methyl methacrylate), polyvinyl acetate), poly(vinylidene chloride), polytetrafluoroethylene, polyisoprene, polyacrylamide, polyacrylic acid, polymethacrylate. Although not required, it may be desired for the adhesive material to include one or more ethylene polymers or copolymers such as ethylene acrylates, ethylene acetates, or the like. Ethylene methacrylate and ethylene vinyl acetate are two preferred ethylene copolymers.

Preferably, when used, the one or more additional polymers comprises about 0.1% to about 50%, more preferably about 1% to about 20% and even more preferably about 5% to about 15% by weight of the adhesive material.

When used in the formulations, the primary purpose of these constituents is to provide more thermoplastic-like characteristics in the uncured state. This might include more uncured flexibility, less tack in the uncured state, reduced cold flow prior to cure, improved processing when typical polymer processing equipment is used. During the curing process, these materials can act as viscosity modifiers to modify sag and flow behaviour.

Filler and Other Components and Additives

The adhesive material of the present invention may also include one or more fillers, including but not limited to particulate materials (e.g., powder), beads, microspheres, or the like. Use of fillers can impart properties such as strength, dimensional stability, and impact resistance to the adhesive they can however reduce elongation properties. Filler addition can also reduce formulation cost and produce products that have less tack prior to cure.

Examples of fillers that may be used include silica, diatomaceous earth, glass, clay (e.g., including nanoclay), talc, pigments, colorants, glass beads or bubbles, carbon or ceramic fibres and nylon or polyamide fibres (e.g., Kevlar). Examples of suitable fillers include, without limitation, wollastonite, talc, vermiculite, pyrophyllite, sauconite, saponite, nontronite, montmorillonite or mixtures thereof. Clays usable for the adhesive material may be calcined or uncalcined. Clays that may be used as fillers may include clays from the kaolinite, illite, chloritem, smecitite or sepiolite groups, which may be calcined. The clays may also include minor amounts of other ingredients such as carbonates, feldspars, micas and quartz.

In one preferred embodiment, one or more mineral or stone type fillers such as calcium carbonate, sodium carbonate or the like may be used as fillers. In another preferred embodiment, silicate minerals such as mica may be used as fillers.

When employed, the amount of fillers in the adhesive material can range from 2% to more than 30% or greater by weight, but more typical from about 8 to 25% by weight, however amounts (below 20%) are preferable in order to retain the desired elongation of the adhesive. According to some embodiments, the adhesive material may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 40% by weight, more preferably about 10% to about 25% by weight.

Other additives, agents or performance modifiers may also be included in the adhesive material as desired, including but not limited to a UV resistant agent, a flame retardant, a heat stabilizer, a colorant, a processing aid, a lubricant, a reinforcement/filler (e.g., chopped or continuous glass, ceramic, aramid, or carbon fibre, particulates or the like).

An adhesion promoter can be desirable for certain embodiments. Although, many adhesion promoters may be used, amine or epoxy functional molecules such as amine or epoxy functional silanes have been found to be particularly desirable. One exemplary adhesion promoter is a glycidoxypropyl trimethoxy silane sold under the tradename Z-6040, commercially available from Dow Corning. Tackifiers such as aliphatic, aromatic or aliphatic/aromatic petroleum resins may be included as can natural rosin ester tackifiers.

A preferred structural adhesive composition according to the present invention comprises
  i. from 10% to 50% epoxy resin;
  ii. from 10% to 30% thermoplastic modifier;
  iii. from 2% to 10% curing agent;
  iv. from 2% to 50% flexibilizer;
  v. from 5% to 40% impact modifier;
  vi. from 0% to 25% filler The impact modifier may be a mixture of impact modifiers.

Optionally containing a blowing agent to provide a foamable formulation.

The percentages are by weight and are based on the total amount of ingredients (i) to (vii) that are present.

Formation and Application of the Adhesive Material

The adhesive may be a liquid, a paste or a solid. In a preferred embodiment the adhesive material is formed as a material that is solid at ambient temperature, is non tacky to the touch and has a substantially homogeneous composition. Various mixing techniques may be used to obtain such a material.

According to one embodiment, the adhesive material may be formed by heating one or more of the components that are generally easier to soften or liquidize such as the polymer based materials to induce those components into a mixable state. Thereafter, the remaining components may then be intermixed with the softened components.

In a preferred embodiment the materials are provided individually, as admixtures or combinations thereof to an extruder. The extruder then mixes the materials to form the adhesive material. Alternatively the adhesive material may be fully mixed and formed and then fed to an extruder for dispensing.

It is important that during mixing the temperature of the components remains below activation temperatures that would cause the adhesive material to thermoharden (cure) and foam if a blowing agent is present. Notably, when the adhesive material contains a blowing agent, the temperature of the adhesive material should be maintained below the temperature that will activate the blowing agent, curing agent, or both. It is important that the material can be applied to the surface to be bonded at a temperature below that at which curing and optionally foaming occur. In situations where it is desirable to maintain the adhesive material at lower temperatures it may be desirable to maintain the components in a semi-solid or viscoelastic state using pressure or a combination of pressure and heat to intermix the components of the adhesive material. Various machines such as extruders, or otherwise have been designed to apply heat, pressure or both to materials.

After formation of the adhesive material, the material is typically applied to a surface or substrate. Preferably, the adhesive is applied as a melt at a temperature below that at which curing and foaming occur. The material may be pelletized for use in extrusion and injection moulding which are preferred methods of application. However, it is possible that the adhesive material can be formed and later simply placed in contact with a desired substrate. Adhesion and activation would occur when both the substrate(s) and formed material comprising the adhesive material are exposed to heat. Following application the material can be cooled to provide a dry to the touch thermohardenable adhesive layer on the substrate. The substrate may then be assembled together with the other components to be bonded perhaps after transportation and the adhesive then activated by heat to develop adhesive properties and form the bond. Activation of the material may include at least some degree of foaming or bubbling in situations where the adhesive material includes a blowing agent. Such foaming or bubbling can assist the adhesive material in wetting a substrate and forming an intimate bond with the substrate. Alternatively, however, it shall be recognized that the adhesive material may be activated to soften and/or flow without foaming or bubbling and may still substantially wet the substrate to form an intimate bond.

Depending upon the intended application, the adhesive material may be applied and activated in different ways and at different times. Thus, exemplary uses of the adhesive material are discussed below to illustrate preferred methodologies of application and activation of the adhesive material. In particular, the adhesive material may be used for, amongst others, reinforcement, sealing and adhering, acoustic baffling or the like. Examples of potential uses for the adhesive material are disclosed in U.S. Pat. No. 7,125,461 and U.S. patent application Ser. No. 11/757,499. The adhesives may also be used as hem flange adhesives as is described in WO 03/022953, European Patent publication 2231348 and GB Patent application 1201943.6.

As another example, the adhesive material may be pressed between the surfaces to be bonded together and subsequently activated. It should also be recognized that the surfaces to be bonded may be part of single component or member or two or more components or members that are attached to each other by the adhesive material and optional additional attachments.

In one embodiment, the surfaces to be bonded are part of the components of an automotive vehicle. In such an embodiment, the adhesive material is typically activated at an elevated temperature employed in an automotive coating drying operation (e.g., at temperatures common to e-coat or automotive painting operations, temperatures typically from 120° C. to 250° C.). Examples of structural adhesive applications are disclosed in U.S. patent application Ser. Nos. 10/234,902; 10/386,287; 60/451,811.

A further requirement of adhesives in certain uses particularly in the automobile industry is that the adhesive will adhere to a metal surface that carries a stamping oil. Additionally it is preferred that the adhesive will flow to cover the entire metal surfaces and that the adhesion to the metal surfaces is stronger than the internal adhesion within the adhesive (e.g., a cohesive failure on the metal). This is assessed by separating the bonded metal surfaces and determining the percentage of the surface area that carries the adhesive.

In another embodiment, the adhesive material is applied as a preformed part; the adhesive material may be shaped to form an adhesive material part of substantially predetermined dimension, for example by moulding or by extrusion and/or cutting.

Forming the adhesive material into a pre-formed part can provide advantages. It can avoid the need for bulky and expensive pumping and dispending equipment. It can provide for easier application of adhesive material in locations where pumpable adhesives are difficult to apply, particularly locations that are hard to reach. The adhesive material parts can be pre-applied to surfaces of components such as metal stampings such that the adhesive material is supplied to an assembly operation PIA (part-in-assembly) (e.g., the adhesive material is supplied to the assembly as the component to which the material has been applied is assembled to the assembly). The adhesive material can also exhibit desirable resistance to "wash off" in, for example, e-coat and/or phosphating operations. These pre-formed part adhesives are particularly useful as hem flange adhesives and as adhesives in automobiles in areas that are prone to deformation during crash where the high elongation can reduce the need for repair and retain corrosion protection.

The invention is illustrated by the following Examples.
The following materials were used in the examples.

| | | |
|---|---|---|
| Phenoxy MB (70% phenoxy PKHJ/30% Epalloy 8220) | | Inchem/CVC Thermoset Specialities |
| Phenoxy MB (70% phenoxy Kukdo YP 50/30% Epalloy 8220) | | Kukdo Chemical/ CVC Thermoset Specialities |
| DY 965 CH | Flexibilizer | Huntsman |
| Mowital LPB 16H | Polyvinyl Butyral | Kuraray |
| Butvar B-90 | Polyvinyl Butyral | Solutia |
| Araldite GY 282 | Bisphenol F Liquid Epoxy Resin | Huntsman |
| Paraloid EXL 2650 A | Core/Shell Polymer Methacrylate/Butadiene/Styrene Impact Modifier | Dow Chemical |
| Garmite 1958 | Quarternay Ammonium nano particle size clay | Rockwood |
| Cellcom AC 7000 DB | Azodicarbonamide Blowing Agent | |
| Omicure U 52 | 4,4 Methylene bis(Phenyl, Dimethyl Urea) Curing Agent | CVC Thermoset Specialities |
| Araldite GT 7071 | Bisphenol A Solid Epoxy Resin | Huntsman |
| Dyhard 100S | Dicyandiamide Curing Agent | |
| Cardolite Lite 2513 HP | Flexibilizer | Cardolite |
| Armoslip CPV | Oleamide | Akzo Nobel |
| Armoslip B | Behenamide | Akzo Nobel |
| Lotryl 35 BA320 | Ethylene/Butyl Acrylate Copolymer | Arkema |
| Calibrite OG | Calcium Carbonate Filler | Omya |
| Araldite LT1522 ES | Solid CTDN Epoxy Resin Adduct Toughening Agent | Huntsman |
| Biostrength 150 | Core shell polymer | Arkema |
| Kane Ace MX 267 | Core shell polymer in liquid epoxy resin | Kaneka |
| Elvamide 8061 | Polyamide (flexibiliser) | Du Pont |
| Amicure CG 1200 | Dicyandiamide curing agent | Air products |
| Zinc oxide | | |

The ingredients were mixed together (in wt % as below) using a heated sigma blade type mixer.

| Example | 1 | 2 | 3 | 4 | 5 | 6 |
|---|---|---|---|---|---|---|
| Araldite GT7071 | 8.60 | 5.43 | 5.26 | | 5.45 | 5.9 |
| DER 331 | | | | 5.00 | | |
| Hypox RF1341 | | | | 12.00 | | |
| Araldite GY282 | 4.30 | 5.43 | 5.26 | | 7.9 | 6.7 |
| Araldite LT 1522 ES | 14.50 | 18.47 | 17.87 | 13.00 | 19 | 16.65 |
| Phenoxy MB (Inchem) | 21.89 | 25 | | | | |
| Phenoxy MB Kukdo | | | 24.19 | | 24.49 | 20.82 |
| SP-TMEP | | | | 35.95 | | |
| Butvar B-90 | 4.26 | | | | | |
| Mowital LP B 16H | | 4.86 | 4.71 | | 4.76 | 4.05 |
| Paraloid EXL 2650A | 11.75 | 13.4 | 12.99 | 17.00 | 13.15 | 11.18 |
| DY 965CH | 7.70 | 9.8 | 9.5 | 9.00 | 7.35 | 5 |
| CardoliteLite2513 HP | 2.60 | 3.26 | 3.16 | | 3.25 | 2.75 |
| Armoslip CPV | 2.60 | 0.3 | 3.16 | | | |
| Armoslip B | | | | | 0.6 | |
| Lotryl 35BA320 | | 5.15 | 5 | | 5.15 | 4.38 |
| Calibrite OG | 14.45 | | | | | 15 |

-continued

| Example | 1 | 2 | 3 | 4 | 5 | 6 |
|---|---|---|---|---|---|---|
| Garmite 1958 | 0.40 | 0.6 | 0.6 | | 0.6 | 0.5 |
| Pigment | | 0.1 | 0.1 | | 0.1 | 0.1 |
| Omicure U52 | 0.50 | 0.5 | 0.5 | 0.5 | 0.5 | 0.5 |
| Dyhard 100S | 5.70 | 7.1 | 7.1 | 6.8 | 7.1 | 6.04 |
| Cellcom AC7000DB | 0.75 | 0.6 | 0.5 | 0.75 | 0.6 | 0.43 |
| Total | 100.00 | 100.00 | 100.00 | 100.00 | 100.00 | 100.00 |

The mixtures were cooled to provide solid materials that were dry to the touch at ambient temperature.

Examples 1 to 4 being comparative and Examples 5 and 6 are of the invention.

The viscosity of the products at 90° C. was

| Example | 1 | 2 | 3 | 4 | 5 | 6 |
|---|---|---|---|---|---|---|
| 0.1 s$^{-1}$ (kPa*s) | 9.21 | 10.6 | 10.6 | 14.9 | 19.2 | 21.2 |
| 10 s$^{-1}$ (kPa*s) | 2.12 | 2.53 | 2.03 | 2.98 | 3.28 | 3.52 |
| 1000 s$^{-1}$ (kPa*s) | 0.043 | 0.042 | | 0.0048 | 0.019 | |

The density and degree of expansion were as follows

| Example | 1 | 2 | 3 | 4 | 5 | 6 |
|---|---|---|---|---|---|---|
| Density g/cm | 1.16 | 1.05 | 1.08 | 1.03 | 1.1 | 1.18 |
| Expansion (25 × 25 × 1 mm) | 107 | 100 | 65 | 72 | 81 | 79 |

The strength properties of the adhesive were measured using the test method ASTM D 638 Type 1 and were as follows

| Example | 1 | 2 | 3 | 4 | 5 | 6 |
|---|---|---|---|---|---|---|
| Tensile Modulus (MPa) | 296 | 178 | 119 | 215 | 162 | 204 |
| Stress @ Max (MPa) | 4.06 | 3.35 | 4.67 | 4.2 | 6.58 | 7.01 |
| Elongation (%) | 8.55 | 7.06 | 53.7 | 13.49 | 21.74 | 15.26 |
| Tg (° C.) DMA | 84.7 | 86.9 | 77.85 | 87.9 | 88.5 | 91.9 |

The materials were coated onto metal coupons covered in stamping oil. The bonding, expanding and curing of the materials was performed by heating the metal in an oven to 185° C. for 20 minutes.

The Lap Shear and Rupture of the metals coupons was

| Example | 1 | 2 | 3 | 4 | 5 | 6 |
|---|---|---|---|---|---|---|
| Maximum Stress, lap shear (MPa) | 6.23 | 7.23 | 8.22 | 11.52 | 9.96 | 9.35 |
| Rupture (% cohesive failure) | 100% | 97% | 98% | 100% | 100% | 100% |

EXAMPLE 7

The following adhesive formulation was prepared in the same manner as was used for Examples 1 to 6, the quantities are in wt %.

| | |
|---|---|
| Phenoxy MB | 22.3 |
| Butvar B90 | 10.4 |
| Araldite LT 1522 E5 | 21.4 |
| Biostrength 150 | 8.9 |
| Cardolite NC514 | 8.3 |
| Kane Ace MX 267 | 9.5 |
| Elvamide 8061 | 10.4 |
| Filler | 2.4 |
| Amicure CG1200 | 4.5 |
| Zinc Oxide | 0.2 |
| Cellcom AC 7000 DB | 1.1 |
| Omicure U 52 | 0.5 |

The adhesive was cured and foamed as in Examples 1 to 6. The expansion of the 25×25×1 mm moulding was 120% and the strength properties of the adhesive when measured using the test method ASTM D 638 Type 1 were as follows

| | |
|---|---|
| Modulus (MPa) | 220 |
| Stress @ Max (MPa) | 5.5 |
| Elongation (%) | 17.7 |
| Tg (° C.) DMA | 89 |
| Expansion (25 × 25 × 1 mm) | 120% |

The invention claimed is:

1. A thermohardenable structural adhesive material including an epoxy resin, a thermoplastic modifier, from 2% to 50% by weight flexibilizer, an impact modifier, and a curing agent that upon curing has an elongation at break of at least 10% and has a glass transition temperature (Tg) of 80° C. or higher;
   wherein the flexibilizer includes a hydroxy terminated polyurethane polymer, polyvinyl butyral, a polyamide, a polymer that is an amine modified epoxy resin, or an epoxidized polysulfide;
   wherein the thermoplastic modifier is a phenoxy resin; and
   wherein the impact modifier comprises an epoxy adduct of a carboxy terminated butadiene rubber.

2. An adhesive according to claim 1 in which the elongation at break of the cured adhesive is at least 15% and preferably at least 20%.

3. An adhesive according to claim 1 in which the stiffness of the cured adhesive is at least 100 MPa and the lap shear is at least 7 MPa.

4. An adhesive according to claim 1, comprising a solid which is non tacky to the touch at ambient temperature.

5. An adhesive according to claim 1, which is processed at an elevated temperature that is below a hardening temperature.

6. An adhesive according to claim 1, wherein the impact modifier comprises a core/shell material.

7. An adhesive according to claim 1, including a blowing agent that is heat activated at a temperature above that at which the adhesive can be melt processed.

8. An adhesive according to claim 1 having a cure temperature of from 120° C. to 250° C.

9. An adhesive according to claim 1 which is melt processable at a temperature in the range 80° C. to 120° C.

10. An adhesive composition according to claim 1 comprising:
   i. from 10% to 50% by weight epoxy resin;
   ii. from 10% to 30% by weight thermoplastic modifier;
   iii. from 2% to 10% by weight curing agent;
   iv. from 2% to 50% by weight flexibilizer;
   v. from 5% to 40% by weight impact modifier,
   vi. from 0% to 25% by weight filler; and
optionally containing a blowing agent.

* * * * *